US012011413B2

(12) United States Patent
Powell

(10) Patent No.: US 12,011,413 B2
(45) Date of Patent: Jun. 18, 2024

(54) SEATED WALKER

(71) Applicant: Annbri, LLC, Bountiful, UT (US)

(72) Inventor: Brian Powell, Bountiful, UT (US)

( * ) Notice: Subject to any disclaimer, the term of this patent is extended or adjusted under 35 U.S.C. 154(b) by 156 days.

(21) Appl. No.: 17/720,076

(22) Filed: Apr. 13, 2022

(65) Prior Publication Data

US 2023/0329957 A1 Oct. 19, 2023

(51) Int. Cl.
*A61H 3/00* (2006.01)
*A61H 3/02* (2006.01)

(52) U.S. Cl.
CPC ..... *A61H 3/0288* (2013.01); *A61H 2003/005* (2013.01); *A61H 2003/007* (2013.01); *A61H 2003/0211* (2013.01); *A61H 2201/0192* (2013.01); *A61H 2201/164* (2013.01)

(58) Field of Classification Search
CPC ........ A61H 2003/005; A61H 2003/007; A61H 2203/0431; A61H 2201/1633
USPC ...................................................... 602/23, 26
See application file for complete search history.

(56) References Cited

U.S. PATENT DOCUMENTS

| | | | | |
|---|---|---|---|---|
| 2,827,897 A * | 3/1958 | Pawlowski | A61F 5/0102 | 602/23 |
| 3,016,060 A * | 1/1962 | Beattie, Sr. | A61H 3/02 | 135/73 |
| 5,178,595 A * | 1/1993 | MacGregor | A61H 3/02 | 482/75 |
| 6,959,716 B1 * | 11/2005 | Schrader | A47C 9/025 | 297/195.11 |
| 7,600,524 B2 * | 10/2009 | West | A61H 3/02 | 135/69 |
| 8,257,291 B2 | 9/2012 | Kazerooni et al. | | |
| 9,060,883 B2 | 6/2015 | Herr et al. | | |
| 9,687,377 B2 | 6/2017 | Han et al. | | |
| 10,080,672 B2 | 9/2018 | Casler et al. | | |
| 10,285,828 B2 | 5/2019 | Herr et al. | | |
| 10,441,493 B2 * | 10/2019 | Adams | A61H 3/00 | |
| 10,531,965 B2 | 1/2020 | Herr et al. | | |
| 10,537,449 B2 | 1/2020 | Han et al. | | |
| 2004/0112415 A1 * | 6/2004 | Shamieh | A61H 3/02 | 135/68 |
| 2010/0010641 A1 * | 1/2010 | Kazerooni | A61H 3/00 | 623/32 |
| 2011/0291374 A1 * | 12/2011 | Kerley | A61H 3/04 | 482/68 |
| 2012/0054137 A1 | 3/2012 | Alush | | |

(Continued)

FOREIGN PATENT DOCUMENTS

| | | | |
|---|---|---|---|
| EP | 2349120 B1 | 3/2017 | |
| EP | 2663267 B1 | 7/2019 | |
| WO | WO-2015118192 A1 * | 8/2015 | A61H 3/04 |

*Primary Examiner* — Noah Chandler Hawk
(74) *Attorney, Agent, or Firm* — Dentons Durham Jones Pinegar; Sarah W. Matthews; Lilly Godfrey

(57) ABSTRACT

A walking assist device includes a vertical support with a proximal end and a distal end, the proximal end coupled to a seat for supporting a user's hip with the user's thigh in a generally horizontal position and a seat attachment member to secure the user's thigh to the seat. The distal end of the vertical support comprises a foot for transferring weight from the user's hip to the ground with the user's thigh in a generally horizontal position. An optional horizontal support extends from the vertical support between the proximal end and the distal end of the vertical support and includes a calf support member.

13 Claims, 5 Drawing Sheets

(56) References Cited

U.S. PATENT DOCUMENTS

| | | | |
|---|---|---|---|
| 2016/0067058 A1 | 3/2016 | Herr | |
| 2017/0143516 A1 | 5/2017 | Herr et al. | |
| 2017/0250632 A1 | 8/2017 | Herr et al. | |
| 2023/0172789 A1 * | 6/2023 | Younger .................. | A61H 3/02 135/68 |

* cited by examiner

SEATED WALKER

TECHNICAL FIELD

The present invention pertains generally to orthopedic devices and methods used to facilitate movement by injured or disabled persons. More particularly, the present invention pertains to devices and methods that use a brace for mobilizing such an injured or disabled person in an upright ambulatory position.

BACKGROUND

Crutches are typically used when a person has an injured leg or is otherwise unable to use their leg. Conventional crutches function by allowing users to put their weight into the crutches, either through their underarm or forearm, bypassing the injured leg entirely. Many different kinds of crutches currently on the market vary in ergonomic support. One disadvantage of convention crutches is that the user must hold onto them, limiting the use of their hands for other purposes. Conventional crutches depend highly on the user's upper arm strength, which for weak or elderly patients may be a problem.

Some solutions offered to traditional crutches include knee scooters or hands-free walking devices. These devices work by resting the knee, in a bent position, on a flat platform. Unlike crutches, knee scooters and hands-free walking devices do not require upper body strength, nor do they put strain on the hands, wrists and arm. However, the devices rest the knee in an unnatural bent position and place extra pressure on the knee. These devices can only be used for foot, ankle, and lower leg injuries.

There is a need for alternatives to crutches, including devices that are simple to use, ergonomic, and allow users with injuries at or above the knee to be able to use them.

SUMMARY OF DISCLOSURE

In one exemplary configuration, a walking assist system comprises: a vertical support comprising a proximal end and a distal end, the proximal end comprising a horizontal seat for positioning beneath a user's hip to support the user's thigh in a horizontal position and a seat attachment member to secure the user's thigh to the horizontal seat; the distal end of the vertical support comprising a foot; and a horizontal support extending from the vertical support between the proximal end and the distal end of the vertical support, the horizontal support comprising a first end and a second end, the first end attached to the vertical support and the second end comprising a calf support member, the calf support member comprising attachment means to secure a lower leg of a user to the calf support member, such that the user's leg is bent at about a 90-degree angle.

In some configurations, the horizontal support is adjustable along a length of the vertical support. Similarly, the vertical support may have a length, and wherein the length is adjustable. For example, the vertical support may comprise an inner sheath and an outer sheath, the inner sheath telescoping within the outer sheath. Similarly, the horizontal support may comprise an inner sheath and an outer sheath, the inner sheath telescoping within the outer sheath.

In other configurations, the length of the vertical support is fixed and the device may be provided at different predetermined lengths to accommodate different users. Similarly, the horizontal support may have a fixed length.

According to another aspect, the foot comprises a rocker foot or a rolling bottom.

In other configurations a seated walker system comprises a vertical support comprising a proximal end and a distal end, the proximal end coupled to a seat for supporting a user's hip with the user's thigh in a generally horizontal position and a seat attachment member to secure the user's thigh to the seat; and the distal end of the vertical support comprising a foot for transferring weight from the user's hip to the ground with the user's thigh in a generally horizontal position.

The seated walker system may include an optional horizontal support extending from the vertical support between the proximal end and the distal end of the vertical support, the horizontal support comprising a medial end and a lateral end, the medial end attached to the vertical support and the lateral end comprising a calf support member, the calf support member comprising attachment means to secure a lower leg of a user to the lateral end of the horizontal support, such that the user's leg is bent at an approximately 90 degree angle. According to another aspect, the seat is able to tilt vertically. According to yet another aspect, the horizontal support is adjustable along a length of the vertical support.

A method is provided for transferring weight from the user's hip to the ground without placing weight on the user's leg and while supporting the user's leg in a natural position, the method comprising: providing a walking assist device, the walking assist device comprising a vertical support with a proximal end and a distal end, the proximal end coupled to a seat for supporting a user's hip with the user's thigh in a generally horizontal position and a seat attachment member to secure the user's thigh to the seat, the distal end of the vertical support comprising a foot for transferring weight from the user's hip to the ground with the user's thigh in a generally horizontal position; and securing a user's thigh to the seat. In one exemplary configuration, the user's thigh is held in a position between 20 degrees below horizontal and 20 degrees above horizontal.

The method may also include providing a walking assist device with a horizontal support extending from the vertical support between the proximal end and the distal end of the vertical support, the horizontal support comprising a medial end and a lateral end, the medial end attached to the vertical support and the lateral end comprising a calf support member, and wherein the method further comprises attaching the user's calf to the calf support member, such that the user's leg is bent at an approximately 90 degree angle. The method may also include the vertical support having an adjustable length and the method further comprises the step of adjusting the length of the vertical support.

BRIEF DESCRIPTION OF DRAWINGS

The following drawings illustrate what are currently considered to be specific representative configurations for carrying out the invention and are not limiting as to embodiments which may be made in accordance with the present invention. The components in the drawings are not necessarily to scale relative to each other. Like reference numerals designate corresponding parts throughout the several views.

The drawings are illustrative and not limiting of the scope of the invention which is defined by the appended claims. The various elements of the invention accomplish various aspects and objects of the invention. Not every element of the invention can be clearly displayed in a single drawing, and as such not every drawing shows each element of the invention.

DETAILED DESCRIPTION

Figure 1:
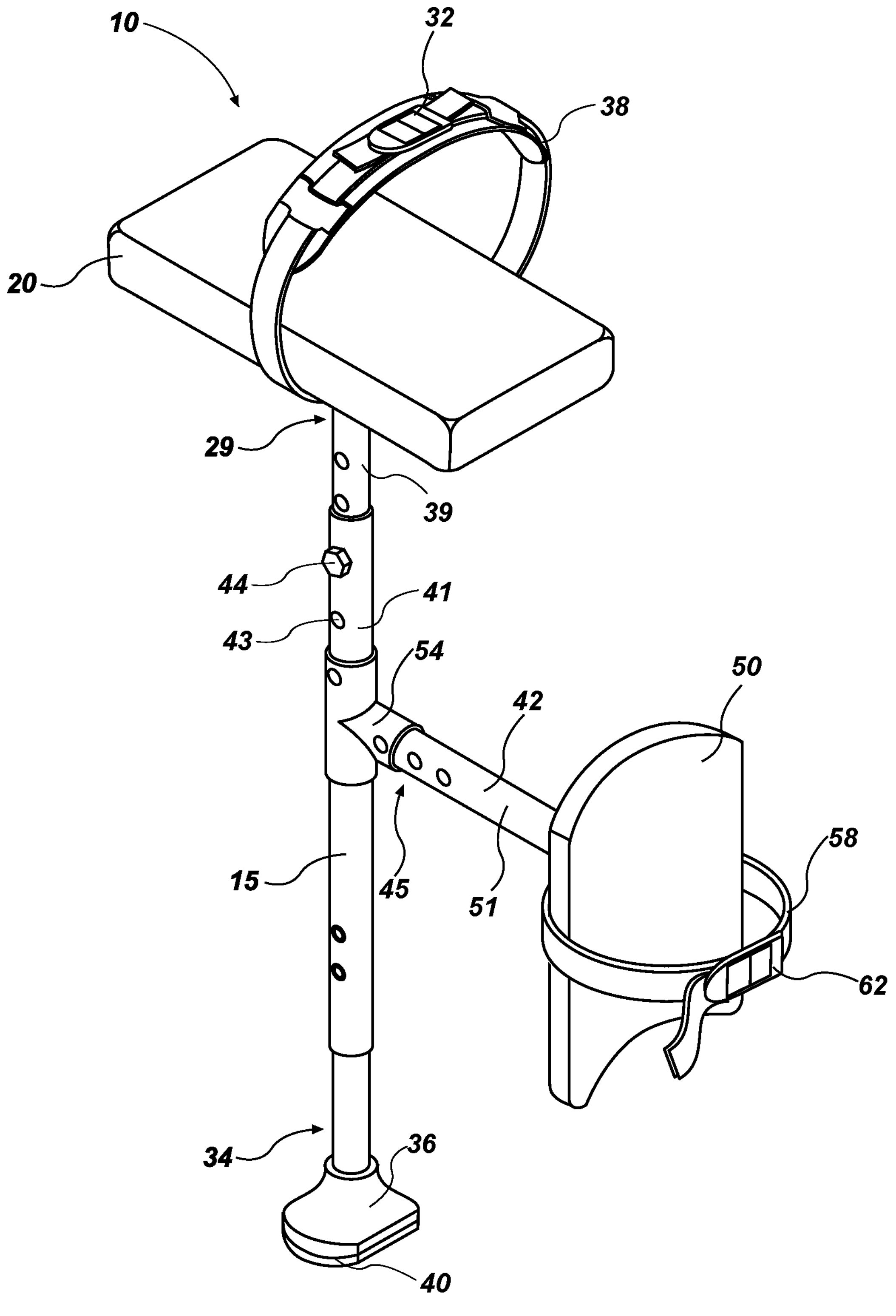
FIG. 1 is a perspective view of a seated walker system according to an exemplary configuration.

The present disclosure relates generally to a system and method for providing a walking assist device. As shown in FIGS. 1-5, the walking assist system 10 may generally include a vertical support 15 with a horizontal seat 20 for positioning beneath the user's glute and/or a posterior portion of the user's thigh. The seat 20 supports the weight from the user's hip and transfers that weight from the user's hip to the ground, bypassing the injured leg. An optional calf support member 50 is also attached to the vertical support 15 below the horizontal seat to support a user's calf.

The vertical support 15 includes a proximal end 29 and a distal end 34. The horizontal seat 20 may be attached or otherwise coupled to the proximal end 29 or may be attached near the proximal end 29. Seat 20 is typically positioned beneath a user's glute and/or posterior portion of a user's thigh and supports the glute and thigh in a horizontal position or a substantially horizontal position. Depending on the needs of the particular user, the seat 20 can be positioned at horizontal, or various angles above or below horizontal. In some configurations the seat 20 may be able to selectively tilt vertically and/or swivel horizontally.

The seat 20 may be planar or substantially planar. Or the seat may have a curve to support the natural curve of the posterior outer circumference of a user's glute and thigh. Similarly, the seat 20 may be provided with one or more cushions to support the user's leg and increase the comfort of the seat 20. In other configurations, the seat 20 is formed of a hard plastic or metal layer with a foam or cushioning layer on top of the hard plastic or metal layer. The seat 20 may be permanently fixed to the vertical support 15 or may be removable.

A seat attachment member 38 secures the user's thigh to the seat 20. A seat attachment member may be attached or otherwise coupled to the seat 20, or may be attached or coupled to the vertical support 15 proximal to the seat 20. The seat attachment member 38 can include a strap, belt, or other similar device to allow the user to adjust the length of the seat attachment member over their thigh. In other configurations, the seat attachment member 38 is non-adjustable but may be provided in a variety of different lengths to accommodate users of various sizes. Any suitable securing mechanism may be used may be used to secure the seat attachment member 38 in place over the user's thigh, such as Velcro, buckle(s) 32, etc.

In FIGS. 1-4, the exemplary configuration includes one seat attachment member 38. In other configurations, two or more seat attachment members 38 may be provided. For example, a superior seat attachment member may be placed to secure a superior portion of the user's thigh to the seat 20 and an inferior seat attachment member may be placed to secure an inferior portion of the user's thigh to the seat 20. Or a single seat attachment member with multiple straps may be used. In yet other configurations, the seat attachment member 38 may be formed as a biased, plastic partially open sleeve. The partially open sleeve can be pulled open (i.e., each side pushed outwardly) to receive a user's glute and/or thigh and then returns to its original configuration after the user's glute and/or thigh is in place.

The vertical support 15 that supports the seat 20 has an adjustable length. For example, the length may be longer for a user with longer legs, or shorter for a user with shorter legs. Exemplary vertical support 15 shown in FIGS. 1-4 includes an inner sheath 39 that can telescope within an outer sheath 41 to adjust the overall length of vertical support 15. Voids 43 in both sheaths allow a lock or pin 44 which is biased outwardly to be placed therethrough to secure the inner sheath 39 in a fixed position (i.e., a fixed length of the vertical support 15), relative to the outer sheath 41. Lock or pin 44 can be a thumb screw, bolt, button lock, or any other suitable means for selectively fixing the inner sheath 39 and outer sheath 41.

To adjust the length of the vertical support 15, the button lock is pressed through the void in the outer sheath 41, and the inner sheath 39 is extended or retracted to the desired length, and the button lock biases outwardly back into place through a void 43 to prevent the vertical support 15 from collapsing. Other ways to adjust the length of the vertical support can also be used, such as twist locks, flip locks, etc. In other configurations, the vertical support 15 has a fixed, non-adjustable length. Various pre-determined lengths may be provided to account for users with shorter or longer legs.

Figure 2:
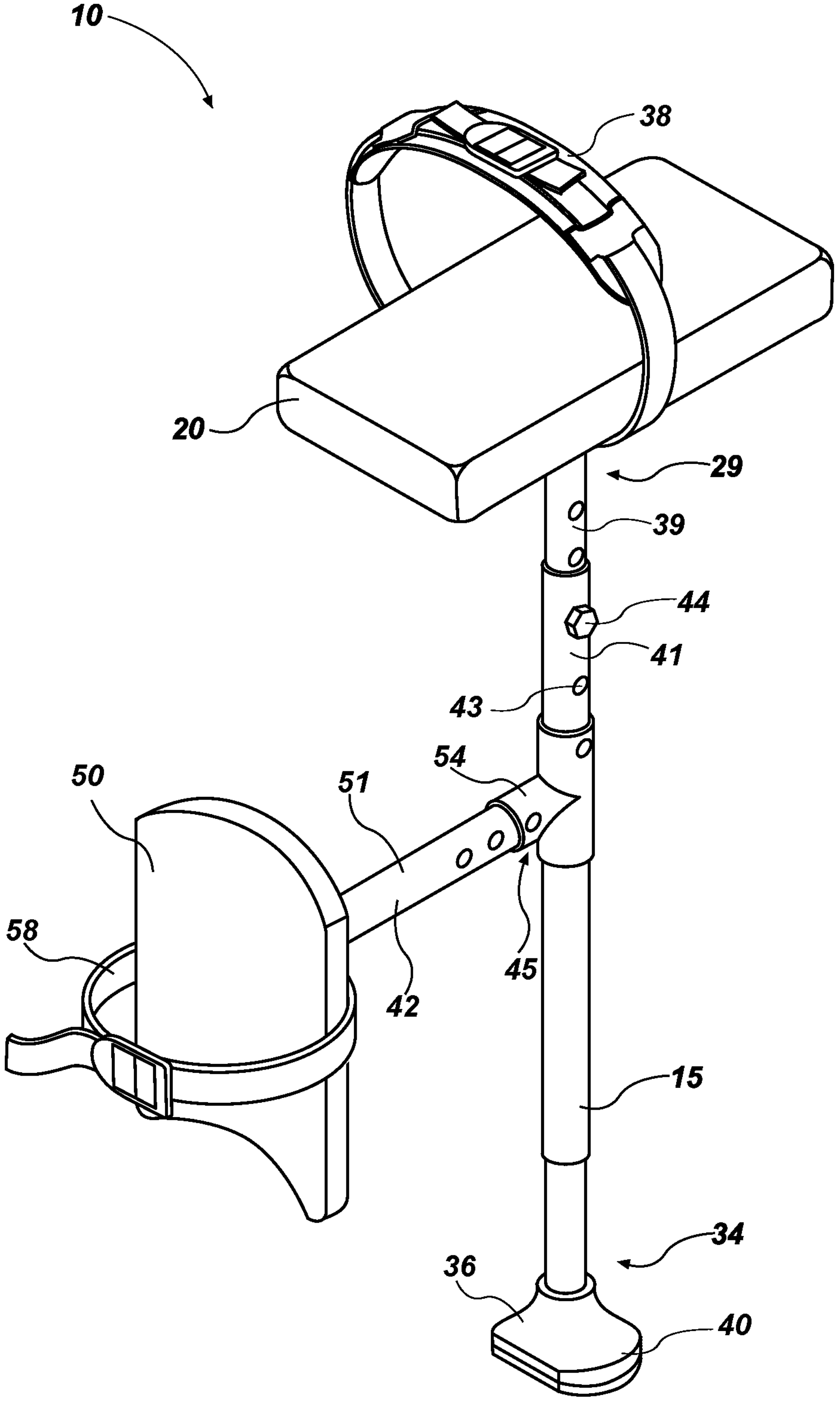
FIG. 2 is another perspective view of the seated walker system of FIG. 1.
Figure 3:
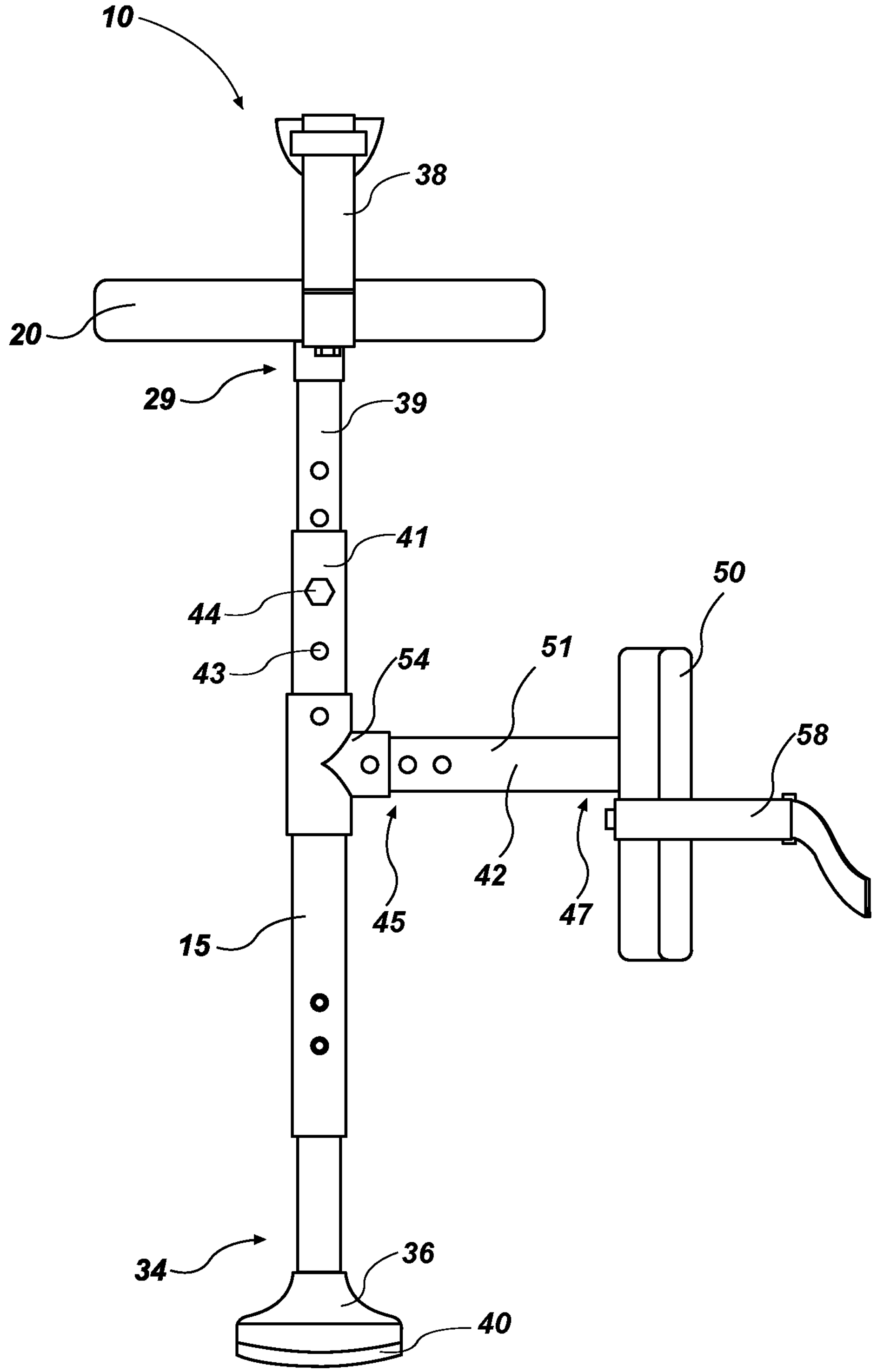
FIG. 3 is a side plan view of the seated walker system of FIG. 1.
Figure 4:
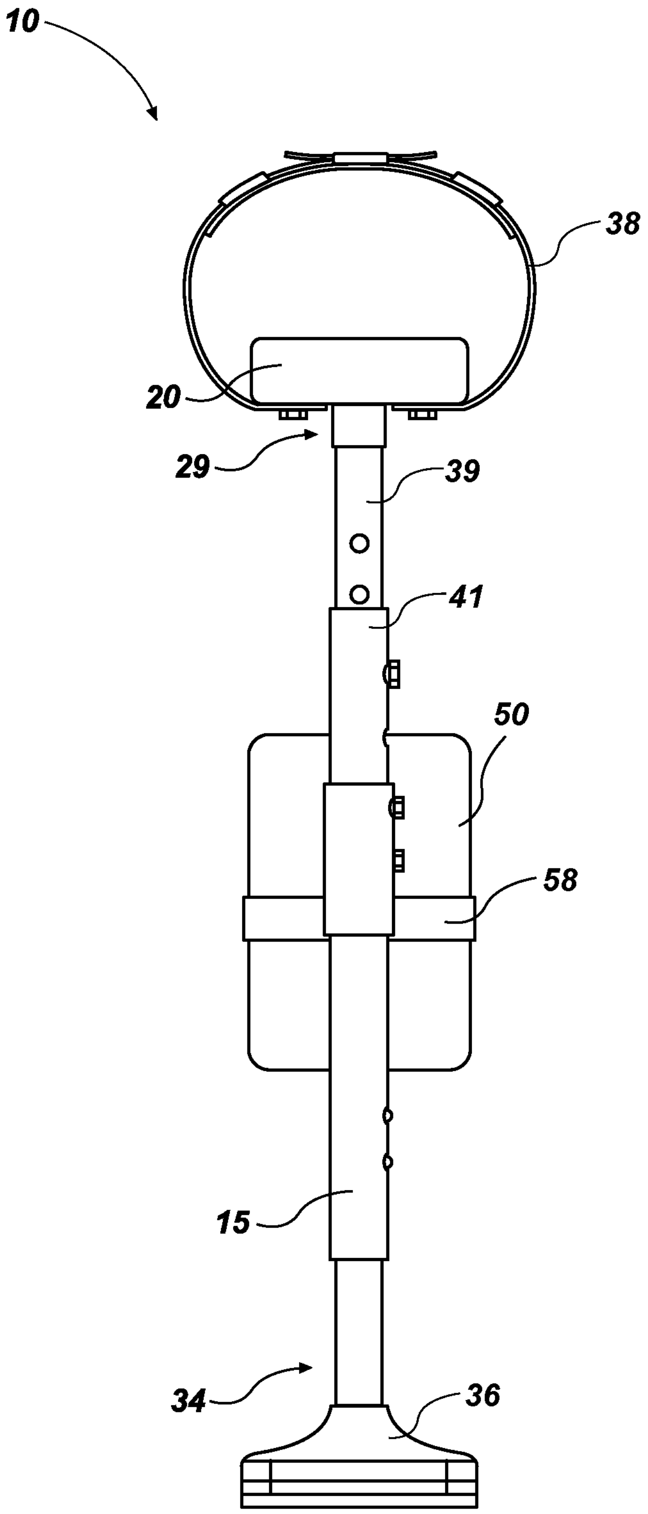
FIG. 4 is a rear plan view of the seated walker system of FIG. 1.

The seat is 20 coupled to the proximal end 29 of the vertical support 15, and the distal end 34 is opposite the proximal end 29 of the vertical support 15. The distal end 34 of vertical support 15 includes a foot 36. The foot 36 contacts the ground and transfers the weight from the user's hip on the seat 20 to the ground, bypassing the injured leg. FIGS. 1-3 illustrate foot 37 as a having a rocker bottom 40. The rocker foot 40 has a curved shape from the front to the back. A rocker foot or rolling bottom or other similar-shaped foot can aid in ergonomic and efficient movement.

In other configurations, the foot 36 may be articulated. Or the foot 36 may be similar to a standard crutch foot with a rubber crutch ferrule, a shock-absorbing crutch ferrule, or any other suitable crutch ferrule or crutch tip known in the art. The foot 36 may be formed of any suitable material such as rubber. Because the foot 36 contacts the ground, forming the foot 36 of material(s) with a high coefficient of friction that is both resilient and compliant can increase traction to reduce slippage of the foot 36 relative to the ground and prevent injuries.

In some configurations, the walking assist system or seated walker 10 includes an optional horizontal support 42. As illustrated in FIGS. 1-3, a horizontal support 42 extends outwardly from the vertical support 15 between the proximal end 29 and the distal end 34 of the vertical support 15. As best seen in FIG. 3, horizontal support 42 includes a first end 45 coupled to the vertical support 15 and a second end 47 coupled to a calf support member 50. Horizontal support 42 is generally orthogonal to the vertical support 15.

The calf support member 50 supports a user's posterior calf when the user's glute and/or posterior thigh is positioned on the seat 20. With the user's glute positioned on seat 20, the user's leg naturally bends at the knee, with the calf extending downwardly. To provide for a more natural step that utilizes both the upper and lower leg, the calf support member 50 couples the user's calf to the vertical support 15. Alternatively, a calf support member may not provided.

Calf support member 50 is typically positioned behind a posterior portion of a user's calf and supports the calf in a vertical position or a substantially vertical position. Depending on the recovery needs of the particular user and their particular injury, the calf support member 50 can be positioned at a vertical angle, or various angles greater than or less than vertical.

Calf support member 50 may have a planar shape or a substantially planar shape. In the exemplary configuration shown in FIGS. 1-4, calf support member is curved to support the natural curve of the posterior outer circumference of a user's calf. Calf support member 50 may be provided with one or more cushions to support the user's leg and increase the comfort of the calf support member 50. In other configurations, the calf support member is formed of a hard plastic or metal layer with a foam or cushioning layer in front of the hard plastic or metal layer.

Calf support member 50 may be adjusted both in a vertical direction (i.e., upwardly and downwardly relative to the vertical support 15) and in a horizontal direction (i.e., inwardly and outwardly relative to the vertical support 15). Or the calf support member 50 may be non-adjustable, and provided in a standard, fixed position.

To adjust the calf support member 50 inwardly and outwardly, horizontal support 42 may have an adjustable length similar to the vertical support 15. Horizontal support 42 may be provided with an inner sheath 51 and an outer sheath 54 that can telescope relative to each other, with a button lock, twist lock, flip lock, etc. In other configurations horizontal support 42 has a fixed, non-adjustable length.

To adjust the calf support member 50 vertically, the first end 45 of the horizontal support which is coupled to the vertical support 15 may be coupled to or otherwise comprise a sheath that can telescope or move along the vertical support 15. Similar to the vertical support 15, a button lock may be provided with voids at predetermined intervals to adjust the calf support member 50 upwardly or downwardly relative to the vertical support.

A calf attachment member 58 secures the user's calf to the calf support member 50. The calf attachment member 58 may be attached or otherwise coupled to the calf support member 50 directly, or may be attached or coupled to the calf support member 50 proximal to the calf support member 50. The calf attachment member 58 can include a strap, belt, or other similar device to allow the user to adjust the length of the seat attachment member over the user's calf. In other configurations, the calf attachment member 58 is non-adjustable but may be provided in a variety of different lengths to accommodate users of various sizes. Any suitable securing mechanism may be used may be used to secure the calf attachment member 58 in place over the user's calf, such as Velcro, buckles 62, etc.

In FIGS. 1-4, the exemplary configuration includes one calf attachment member 58. In other configurations, two or more calf attachment members 58 may be provided. For example, a superior calf attachment member may be placed to secure a superior portion of the user's calf to the calf support member 50 and an inferior seat attachment member may be placed to secure an inferior portion of the user's calf to the calf support member 50. Or a single calf attachment member with multiple straps may be used. In yet other configurations, the calf attachment member 58 may be formed as a plastic partially open sleeve that can be pulled open to receive a user's calf and then is biased to return to its original configuration after the user's calf is in place.

The walking assist system 10 may be formed of any suitable type of material. In some configurations, a strong and lightweight material may be used to support the user's leg and minimize weight of the device. A solid material may be used. Or a hollow or perforated material may be used to increase the tensile strength of the device while also reducing the weight. Exemplary materials may include aluminum, carbon fiber, plastic, metal alloys, etc. Custom molded plastic may be used, particularly for the seat 20 and/or calf support 50. Any suitable material, now known or hereafter developed, may be used in forming the walking assist system 10 described herein. Additionally, accessories may be included with the walking assist system 10. For example, an arm support may be added similar to standard crutches.

In use, the walking assist system may first be adjusted based on the needs of the particular user. For example, the length of the vertical support 15 may be elongated or shortened based on the user's leg length. For configurations with an adjustable seat 20, the seat may be further adjusted (i.e., tilted vertically, swiveled horizontally, etc.) for the desired ergonomic position. The calf support member 50 can also be adjusted. For example, the horizontal support 42 that connects the calf support member 50 to the vertical support 15 can be adjusted in length, moving calf support member 50 inwardly or outwardly. Calf support member 50 can also be moved upwardly and downwardly with respect to the vertical support 15. Or in configurations without a calf support member, the user's lower leg may be free-floating and there is no need to adjust a calf support member.

Figure 5:
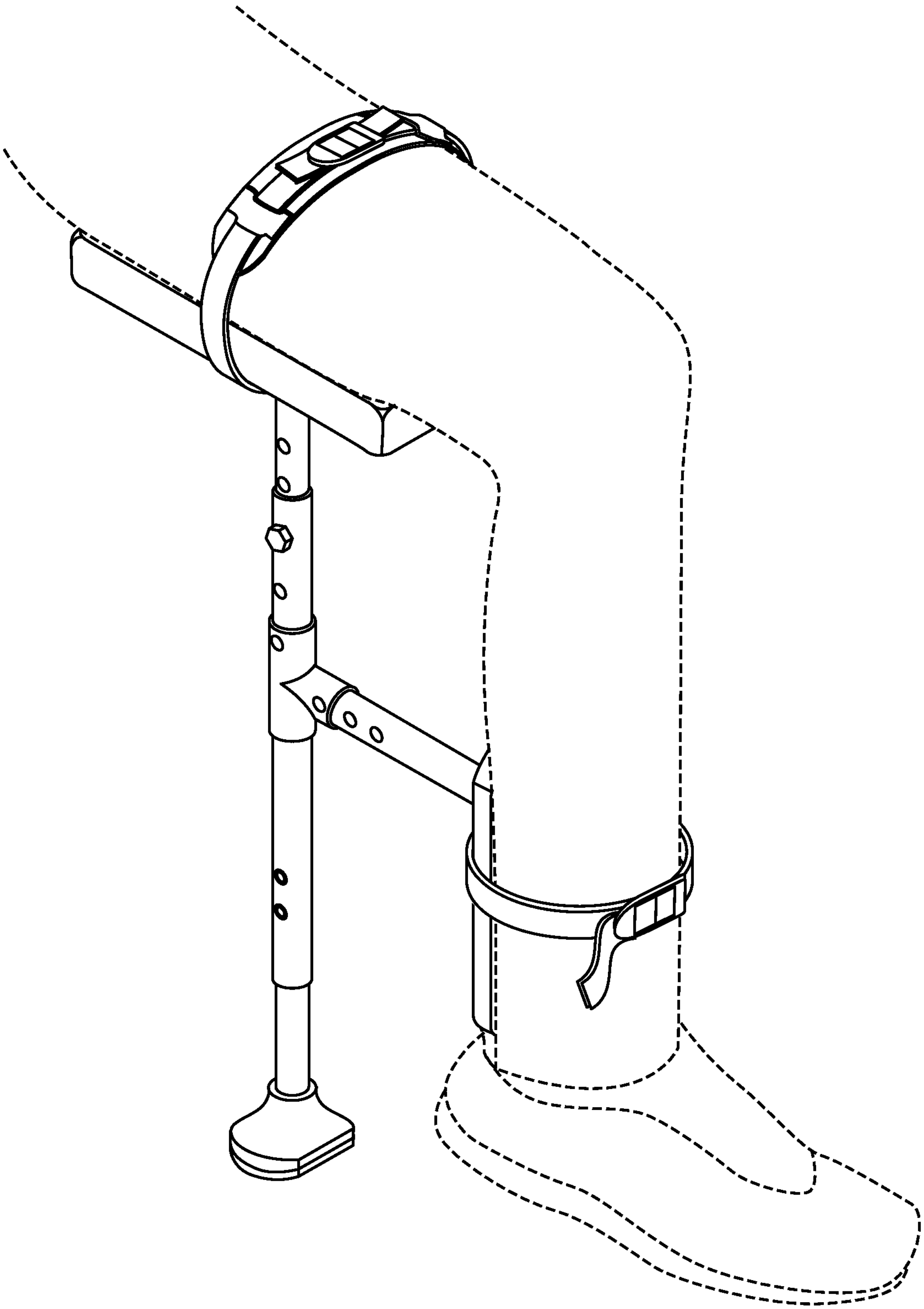
FIG. 5 is a perspective view of the walking assist device as shown in use.

After the walking assist system 10 is adjusted for the need of the particular user, a user attaches their leg to the system 10. FIG. 5 shows a perspective view of the walking assist system 10 in place on a user. The user first places their glute onto seat 20 such that the glute, hip, and/or posterior portion of the user's thigh is supported by seat 20. The user's thigh is then attached to the seat 20 using one or more seat attachment member(s) 38. With the walking assist system 10 in place, the user can effectively transfer weight from their hip to the ground, without the need for placing the leg in an unnatural bent position. This also allows the user's glute and/or thigh to be a weight-bearing surface, rather than the knee, to reduce knee pain associated with other walking assist devices. The leg is held in a position such that the thigh is generally horizontal, or more horizontal than vertical. For example, the thigh may be horizontal, or may be between 20 degrees below horizontal to 20 degrees above horizontal. The knee is bent at about a 90-degree angle, or slightly less than a 90-degree angle, such as between a 45-degree angle and a 110-degree angle.

In configurations with a calf support member 50, the user similarly places their calf on the calf support member 50 and attaches their calf to the calf support member using one or more calf support attachment member(s) 58.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination.

Unless otherwise indicated, all numbers expressing measurements and quantities used in the specification and claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. In one embodiment, the terms "about," "approximately," and "substantially" refer to numerical parameters within 10% of the indicated range.

The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Specific embodiments disclosed herein may be further limited in the claims using consisting of or consisting essentially of language. Various aspects discussed in one drawing may be present and/or used in conjunction with the embodiment shown in another drawing, and each element shown in multiple drawings may be discussed only once. All statements herein reciting principles, aspects, and embodiments of the invention, as well as specific examples thereof, are intended to encompass equivalents thereof. The described features, structures, or characteristics of configurations of the invention may be combined in any suitable manner in one or more configurations.

As used in this specification and the appended claims, singular forms such as "a," "an," and "the" may include the plural unless the context clearly dictates otherwise. Thus, for example, reference to "a button lock" may include one or more of button locks, and reference to "the seat attachment member" may include reference to one or more of such seat attachment members.

As used herein, the term "substantially" refers to the complete or nearly complete extent or degree of an action, characteristic, property, state, structure, item, or result to function as indicated. For example, a seat that is "substantially" horizontal may be either completely horizontal or nearly completely horizontal. As used herein the term "generally" refers to something that is more of the designated adjective than not, or the converse if used in the negative. As used herein, a plurality of items, structural elements, compositional elements, and/or materials may be presented in a common list for convenience. However, these lists should be construed as though each member of the list is individually identified as a separate and unique member. Additionally, the word "connected" and "coupled" is used throughout for clarity of the description and can include either a direct connection or an indirect connection.

Aspect 1: A walking assist system comprising:

a vertical support comprising a proximal end and a distal end, the proximal end comprising a horizontal seat for positioning beneath a user's hip to support the user's thigh in a horizontal position and a seat attachment member to secure the user's thigh to the horizontal seat;

the distal end of the vertical support comprising a foot; and a horizontal support extending from the vertical support between the proximal end and the distal end of the vertical support, the horizontal support comprising a first end and a second end, the first end attached to the vertical support and the second end comprising a calf support member, the calf support member comprising attachment means to secure a lower leg of a user to the calf support member, such that the user's leg is bent at about a 90 degree angle.

Aspect 2: The walking assist system of Aspect 1, wherein the horizontal support is adjustable along a length of the vertical support.

Aspect 3: The walking assist system of Aspect 1 or 2, wherein the vertical support has a length, and wherein the length is adjustable.

Aspect 4: The walking assist system of any one of Aspects 1-3, wherein the vertical support comprises an inner sheath and an outer sheath, the inner sheath telescoping within the outer sheath.

Aspect 5: The walking assist system of any one of Aspects 1-4, wherein the vertical support has a length, and wherein the length is fixed.

Aspect 6: The walking assist system of any one of Aspects 1-5, wherein the horizontal support has a length, and wherein the length is adjustable.

Aspect 7: The walking assist system of any one of Aspects 1-6, wherein the horizontal support comprises an inner sheath and an outer sheath, the inner sheath telescoping within the outer sheath.

Aspect 8: The walking assist system of any one of Aspects 1-7, wherein the horizontal support has a length, and wherein the length is fixed.

Aspect 9: The walking assist system of any one of Aspects 1-8, wherein the foot comprises a rocker foot.

Aspect 10: A seated walker system comprising:

a vertical support comprising a proximal end and a distal end, the proximal end coupled to a seat for supporting a user's hip with the user's thigh in a generally horizontal position and a seat attachment member to secure the user's thigh to the seat; and the distal end of the vertical support comprising a foot for transferring weight from the user's hip to the ground with the user's thigh in a generally horizontal position.

Aspect 11: The seated walker system of Aspect 10, wherein the vertical support has a length, and wherein the length is adjustable.

Aspect 12: The seated walker system of Aspect 10 or Aspect 11, wherein the seat is able to tilt vertically.

Aspect 13: The seated walker system of any one of Aspects 10-12, further comprising a horizontal support extending from the vertical support between the proximal end and the distal end of the vertical support, the horizontal support comprising a medial end and a lateral end, the medial end attached to the vertical support and the lateral end comprising a calf support member, the calf support member comprising attachment means to secure a lower leg of a user to the lateral end of the horizontal support, such that the user's leg is bent at an approximately 90 degree angle.

Aspect 14: The seated walker system of any one of Aspects 10-13, wherein the horizontal support has a length, and wherein the length is adjustable.

Aspect 15: The seated walker system of any one of Aspects 10-14, wherein the horizontal support is adjustable along a length of the vertical support.

Aspect 16: The seated walker system of any one of Aspects 10-15, wherein the foot has a rolling bottom.

Aspect 17: A method transferring weight from the user's hip to the ground without placing weight on the user's leg and while supporting the user's leg in a natural position, the method comprising:

providing a walking assist device, the walking assist device comprising a vertical support with a proximal end and a distal end, the proximal end coupled to a seat for supporting a user's hip with the user's thigh in a generally horizontal position and a seat attachment member to secure the user's thigh to the seat, the distal end of the vertical support comprising a foot for transferring weight from the user's hip to the ground with the user's thigh in a generally horizontal position; and securing a user's thigh to the seat.

Aspect 18: the method of Aspect 17, wherein the user's thigh is held in a position between 20 degrees below horizontal and 20 degrees above horizontal.

Aspect 19: the method of Aspect 17 or 18, wherein the walking assist device further comprises a horizontal support extending from the vertical support between the proximal end and the distal end of the vertical support, the horizontal support comprising a medial end and a lateral end, the medial end attached to the vertical support and the lateral end comprising a calf support member, and wherein the method further comprises attaching the user's calf to the calf support member, such that the user's leg is bent at an approximately 90 degree angle.

Aspect 20: the method of any one of Aspects 17-19, wherein the vertical support has an adjustable length and the method further comprises the step of adjusting the length of the vertical support.

Although the foregoing disclosure provides many specifics, these should not be construed as limiting the scope of any of the ensuing claims. Other embodiments and configurations may be devised which do not depart from the scopes of the claims. Features from different embodiments and configurations may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

The invention claimed is:

1. A walking assist system comprising:

a vertical support comprising a proximal end and a distal end, the proximal end comprising a horizontal seat for positioning beneath a user's hip to support the user's thigh in a horizontal position and a seat attachment member to secure the user's thigh to the horizontal seat;

the distal end of the vertical support comprising a foot; and a horizontal support extending from the vertical support between the proximal end and the distal end of the vertical support, the horizontal support comprising a first end and a second end, the first end attached to the vertical support and the second end comprising a calf support member, the calf support member comprising attachment means to secure a lower leg of a user to the calf support member, such that the user's leg is bent at about a 90 degree angle, the calf support member being substantially vertical and substantially parallel to the vertical support, and having a curved surface to support the user's calf, and wherein a user's foot and ankle is not secured to the vertical support, the horizontal support, and/or the calf support member such that the user's foot and ankle remain free.

2. The walking assist system of claim 1, wherein the horizontal support is adjustable along a length of the vertical support.

3. The walking assist system of claim 1, wherein the vertical support has a length, and wherein the length is adjustable.

4. The walking assist system of claim 3, wherein the vertical support comprises an inner sheath and an outer sheath, the inner sheath telescoping within the outer sheath.

5. The walking assist system of claim 1, wherein the vertical support has a length, and wherein the length is fixed.

6. The walking assist system of claim 1, wherein the horizontal support has a length, and wherein the length is adjustable.

7. The walking assist system of claim 6, wherein the horizontal support comprises an inner sheath and an outer sheath, the inner sheath telescoping within the outer sheath.

8. The walking assist system of claim 1, wherein the horizontal support has a length, and wherein the length is fixed.

9. The walking assist system of claim 1, wherein the foot comprises a rocker foot.

10. A method of transferring weight from the user's hip to the ground without placing weight on the user's foot, knee joint, or below the knee joint and while supporting the user's leg in a natural position, the method comprising:

providing a walking assist device, the walking assist device comprising a vertical support comprising a proximal end and a distal end, the proximal end coupled to a seat for supporting a user's hip with the user's thigh in a generally horizontal position and a seat attachment member to secure the user's thigh to the seat, the distal end of the vertical support comprising a foot for transferring weight from the user's hip to the ground with the user's thigh in a generally horizontal position;

securing a user's lower leg to a calf support, the calf support adjustably attachable to the vertical support and comprising one or more cushions to support the user's lower leg; and securing a user's thigh to the seat, wherein weight will be placed on the user's hip to a distal portion of the user's femur without placing weight on the user's knee joint or below.

11. The method of claim 10, wherein the user's thigh is held in a position between 20 degrees below horizontal and 20 degrees above horizontal.

12. The method of claim 10, wherein the walking assist device further comprises a horizontal support extending from the vertical support between the proximal end and the distal end of the vertical support, the horizontal support comprising a medial end and a lateral end, the medial end attached to the vertical support and the lateral end comprising a calf support member, and wherein the method further comprises attaching the user's calf to the calf support member, such that the user's leg is bent at an approximately 90 degree angle.

13. The method of claim 10, wherein the vertical support has a adjustable length and the method further comprises the step of adjusting the length of the vertical support.

* * * * *